(12) United States Patent
Okamura et al.

(10) Patent No.: US 6,591,192 B2
(45) Date of Patent: Jul. 8, 2003

(54) VEHICLE SURROUNDING MONITORING APPARATUS

(75) Inventors: Shigekazu Okamura, Tokyo (JP); Minoru Nishida, Tokyo (JP); Kenji Ogawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 46 days.

(21) Appl. No.: 09/993,507

(22) Filed: Nov. 27, 2001

(65) Prior Publication Data

US 2002/0177953 A1 Nov. 28, 2002

(30) Foreign Application Priority Data

May 23, 2001 (JP) ........................................ 2001-154404

(51) Int. Cl.$^7$ ................................................ G08G 1/16
(52) U.S. Cl. ........................ 701/301; 701/96; 342/455; 340/436
(58) Field of Search ............................ 701/93, 96, 300, 701/301; 340/903, 435, 436; 342/455; 348/148

(56) References Cited

U.S. PATENT DOCUMENTS

| | | | | |
|---|---|---|---|---|
| 5,600,561 A | | 2/1997 | Okamura | .................... 340/903 |
| 5,754,099 A | * | 5/1998 | Nishimura et al. | ......... 340/435 |
| 5,832,407 A | | 11/1998 | Kai et al. | .................... 701/205 |
| 5,986,601 A | * | 11/1999 | Sugimoto | .................... 342/70 |
| 6,226,571 B1 | * | 5/2001 | Kai | ................................ 701/1 |
| 6,269,308 B1 | * | 7/2001 | Kodaka et al. | ............. 701/301 |
| 6,317,692 B2 | * | 11/2001 | Kodaka et al. | ............. 701/301 |
| 6,317,693 B2 | * | 11/2001 | Kodaka et al. | ............. 701/301 |
| 6,466,863 B2 | * | 10/2002 | Shirai et al. | ................. 701/200 |
| 2001/0025211 A1 | * | 9/2001 | Shirai et al. | ................... 701/1 |
| 2002/0107637 A1 | * | 8/2002 | Okamura et al. | ........... 701/301 |

FOREIGN PATENT DOCUMENTS

JP          6-131598        5/1994

\* cited by examiner

*Primary Examiner*—Gary Chin
(74) *Attorney, Agent, or Firm*—Sughrue Mion, PLLC (57) ABSTRACT

A vehicle surrounding monitoring apparatus includes an object position detecting device for periodically detecting a distance of from the self vehicle to the object that exists in the periphery of the self vehicle and an orientation directed from the self vehicle toward the object; an object position converting device for calculating the estimated values of a distance and an orientation which are estimated when said object is detected at the present time; an stop object judging means for judging whether said object is a stop object, or not; and a relative speed calculating device for judging whether the previous object and the present object which are detected by said object position detecting device are identical with each other, or not, to calculate the relative speed on the basis of the relative position of the same object.

5 Claims, 7 Drawing Sheets

VEHICLE SURROUNDING MONITORING APPARATUS

BACKGROUND OF THE INVENTION

1. Field of the Invention

The present invention relates to a vehicle surrounding monitoring apparatus for detecting a vehicle or an obstacle which exists in the periphery of a subject vehicle.

2. Description of the Related Art

In general, as a protection safety device for an automobile, there has been proposed an inter-vehicle distance alarming device that measures the surrounding of a subject vehicle, in particular, a distance (inter-vehicle distance) to another vehicle existing in front of the subject vehicle and generates an alarm to a driver in the case where the inter-vehicle distance is short, or an inter-vehicle distance control device that automatically adjusts a speed of the subject vehicle so that the inter-vehicle distance is not short. In those devices, in order to measure the inter-vehicle distance and a relative speed which is a variation of the inter-vehicle distance, an inter-distance detecting device using a laser radar or a stereo camera has been frequently employed.

In those detecting devices, since it is difficult to directly measure the relative speed, the correspondence of an object to be detected in time series is conducted, and a relative speed is obtained from a position difference and an elapsed time of the object that is identical in correspondence in a method disclosed in, for example, Japanese Patent Application Laid-open No. Hei 6-131598.

Figure 7:
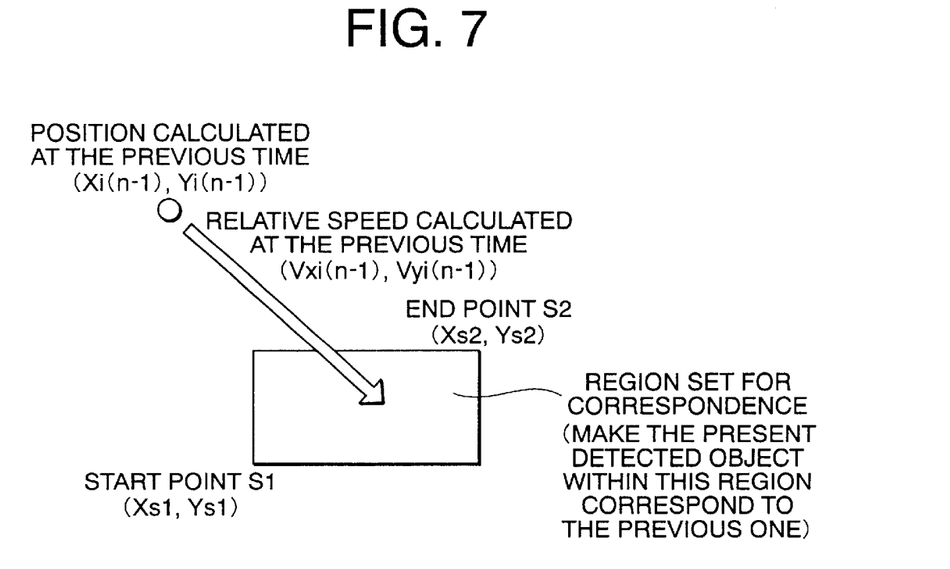
FIG. 7 is an explanatory diagram for explanation of a correspondence in a conventional vehicle surrounding monitoring apparatus.

The method will be described in more detail with reference to FIG. 7. In this method, a window is set on the basis of a position and a relative speed of an object which has been detected at a previous time with respect to a subject vehicle. For example, a window represented by a start point S1 and an end point S2 which are obtained, for example, by using the following expressions (1) to (4) with respect to an object which has been first detected at a previous time and using the following expressions (5) and (6) with respect to an object which has been detected till the previous time. (X1s, Y1s) and (X2s, Y2s) are positions of the start point S1 and the end point S2, respectively.

$$X1s = Xi(1) - 0.5 \quad (1)$$

$$Y1s = Yi(1) - (27.8 - Vs) \times \Delta T \quad (2)$$

$$X2s = Xi(1) + 0.5 \quad (3)$$

$$Y2s = Yi(1) + Vs \times \Delta T \quad (4)$$

$$X1s = (Xi(1) + Vxi(1) \times \Delta T) - 0.5 \quad (5)$$

$$Y1s = (Xi(1) + Vyi(1) \times \Delta T) - 0.5 \quad (6)$$

$$X2s = (Xi(1) + Vxi(1) \times \Delta T) + 0.5 \quad (7)$$

$$Y2s = (Xi(1) + Vyi(1) \times \Delta T) + 0.5 \quad (8)$$

In the above expressions (1) to (8), (Xi(1),Yi(1)) represents a previous position of an i-th object, (Vxi(1),Vyi(1)) are a relative speed of the i-th object, Vs is a self-vehicle speed, and $\Delta T$ is a range finding period.

Then, if the object contained within the window is also detected at this time, correspondence is made such that the object detected at this time is identical with the object detected at the previous time. Although a case in which a plurality of objects exist within a set estimated region is not disclosed in Japanese Patent Application Laid-open No. Hei 6-131598, there is proposed that the correspondence of an object whose distance to the subject vehicle is closest to the estimated position is made. Then, the difference values of those positions of the corresponding objects are obtained and the relative speed is calculated by using the detected period.

However, when the relative speed of the object in the periphery of the subject vehicle is calculated through the above-mentioned conventional art, the correspondence in the time series is in error and a large error occurs in the calculated relative speed in the following circumstances. That is, the circumstances are directed to a case where a stop object (moving object) is closer to the estimated position than a moving object (stop position) to be subjected to correspondence among the objects that have been detected at this time, or a case where a moving object (stop object) to be subjected to correspondence cannot be detected, and other stop object (moving object) than the moving object is contained in the estimated region. That is, the above error is liable to occur in the case where a plurality of stop objects and moving objects are detected with mixed together. As a result, a false alarm occurs in the inter-vehicle distance alarm device and a ride quality is deteriorated in the inter-vehicle distance control device.

SUMMARY OF THE INVENTION

The present invention has been made in order to solve the above problems, and therefore an object of the present invention is to provide a vehicle surrounding monitoring apparatus in which it is judged whether a detected object is a stop object, or not, on the basis of a self-vehicle speed and yaw rate, in advance, and thereafter correspondence in time series for calculating a relative speed is conducted by using the judgment result of the stop object, that is, the objects are classified into objects which are judged as the stop objects and objects which are judged as the moving objects, and the correspondence and the calculation of the relative speed are conducted. As a result, the amount of processing of the stop object judgment can be reduced, the misjudgment can be reduced and an improvement in the calculation accuracy of the relative speed can be made.

A vehicle surrounding monitoring apparatus according to the present invention, for detecting an object that exists in the periphery of a self vehicle and detects a relative speed calculated on the basis of a relative position with respect to the self vehicle, comprises: an object position detecting means for periodically detecting object position data including a distance of from the self vehicle to the object that exists in the periphery of the self vehicle and an orientation directed from the self vehicle toward the object; a self-vehicle speed detecting means for periodically detecting the speed of the self vehicle; a yaw rate detecting means for periodically detecting a yaw rate which is the rotation rate of the self vehicle in a yaw direction; an object position converting means for converting the previous object position data detected by the object position detecting means into object position data which is estimated to be obtained when the previous object position is detected at the present self-vehicle position on the basis of the self-vehicle speed information detected by the self-vehicle speed detecting means and the yaw rate information detected by said object position detecting means; an object position storing means for storing the object position data converted by the object position converting means; a stop object judging means for judging whether the object is a stop object, or not, on the basis of the object position data stored in the object position storing means and the object position data detected at the present time by said object position detecting means; and a relative speed calculating means for judging whether the previous object and the present object which are detected by said object position detecting means are identical with each other, or not, on the basis of the object position data detected at the previous time by the object position detecting means, the object position data detected at the present time by the object position detecting means, and the judging result by the stop object judging means to calculate the relative speed on the basis of the relative position of the same object.

Further, the stop object judging means detects the region having the object position data detected at the present time by the object position detecting means in the case where the coordinate space regulated by the self-vehicle coordinate system having the widthwise direction of the vehicle as the x-direction and the forwarding direction as the y-direction is divided into the mesh-like regions each having the given size, and the stop object judging means counts the number of object position data within the region detected at the present time and judges whether the detected object is an stop object, or not in accordance with whether the count value of the object position data is a given value, or not.

Further, the stop object judging means divides the coordinate space regulated by the self-vehicle coordinate system into the mesh-like regions each having a size set in accordance with the self-vehicle speed.

Further, the stop object judging means provides a region having a given size set in accordance with each of the object positions in the periphery of each of the object positions detected at the present time by the object position detecting means, and judges that the detected object is a stop object in the case where the count value of the object position data that exists within a region having the given size set in accordance with each of the object positions among the objects stored in the object position calculation result storing means is equal to or more than a given value.

Further, the relative speed calculating means makes the objects that are judged as the stop objects and the objects that are judged as the moving objects to correspond to each other as the same object in the time series by using the judging result of said stop object judging means, and calculates the relative speed.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

(First Embodiment)

Figure 1:
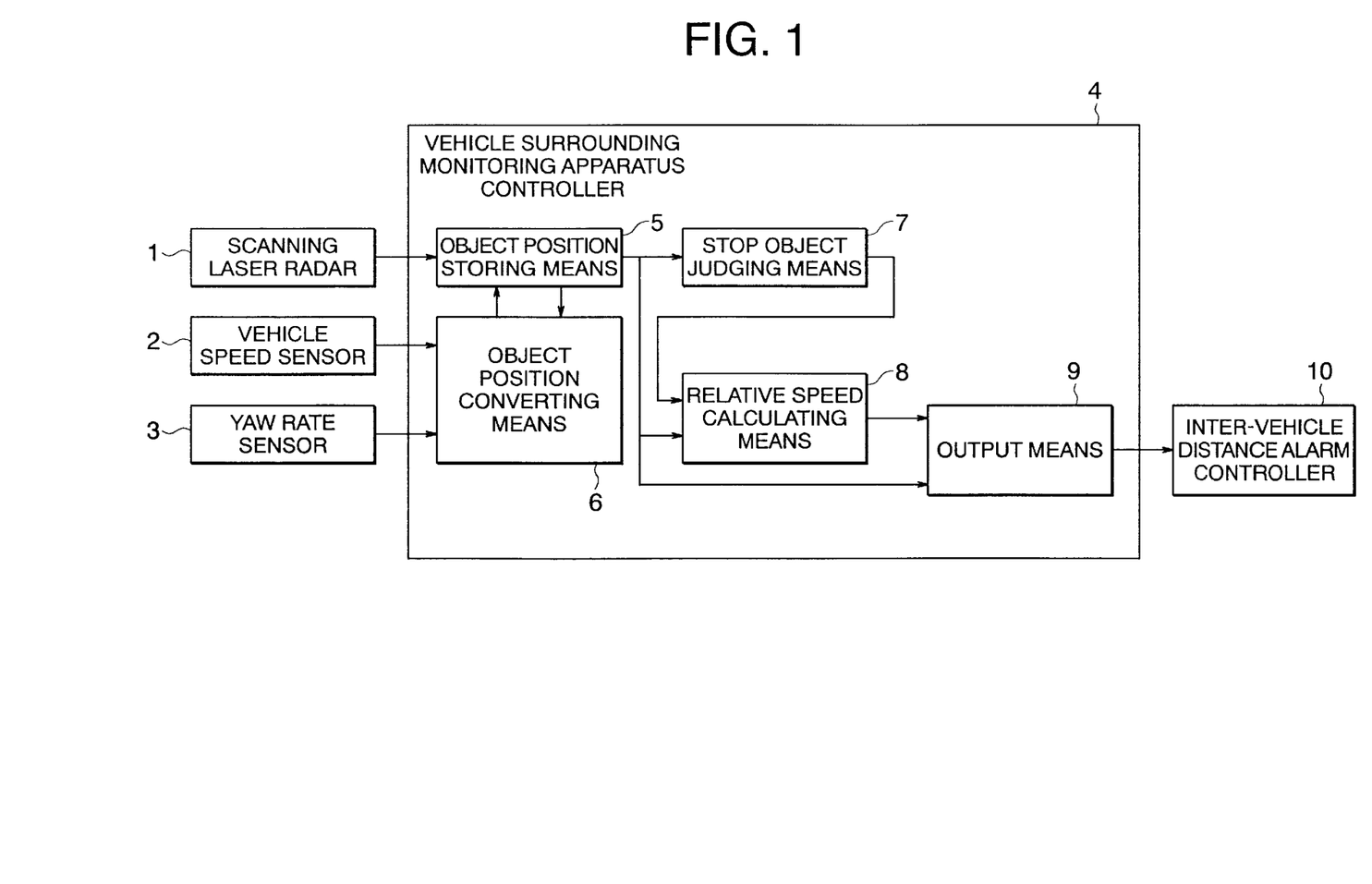
FIG. 1 is a structural view showing a vehicle surrounding monitoring apparatus in accordance with first and second embodiments of the present invention.

FIG. 1 is a structural view showing a vehicle surrounding monitoring apparatus in accordance with first and second embodiments of the present invention. Referring to FIG. 1, reference numeral 1 denotes a scanning laser radar, reference numeral 2 is a vehicle speed sensor, reference numeral 3 is a yaw rate sensor, reference numeral 4 is a vehicle surrounding monitoring apparatus controller, reference numeral 5 is an object position storing means, reference numeral 6 is an object position converting means, reference numeral 7 is a stop object judging means, reference numeral 8 is a relative speed calculating means, reference numeral 9 is an output means, and 10 is an inter-vehicle distance alarm controller.

In the figure, the scanning laser radar 1 that serves as an object position detecting means is so arranged as to irradiate pulsed infrared rays toward the surrounding of a self vehicle in a given period, detect the reflected pulses of the infrared rays reflected from the surrounding object and obtain a distance to the surrounding object on the basis of a time interval between the irradiation and the detection, to thereby detect a relative position with respect to the self vehicle of the reflected object together with an irradiation direction. This scanning laser radar 1 corresponds to a position information producing means disclosed in the above-described Japanese Patent Application Laid-open No. Hei 6-131598.

The vehicle speed sensor 2 and the yaw rate sensor 3 are so arranged as to measure the speed and the yaw rate (the rotating rate in a yaw direction) of the self vehicle, respectively. The vehicle surrounding monitoring apparatus controller 4 is a calculating device made up of a micro computer, a memory and so on, and is made up of an object position storing means 5, an object position converting means 6, a stop object judging means 7, a relative speed calculating means 8 and an output means 9 which will be described later. The inter-vehicle distance alarm controller 10 is so designed as to judge whether the inter-vehicle distance is short, or not, on the basis of the position and the relative speed of the vehicle surrounding object and generate an alarm to a driver.

Figure 2:
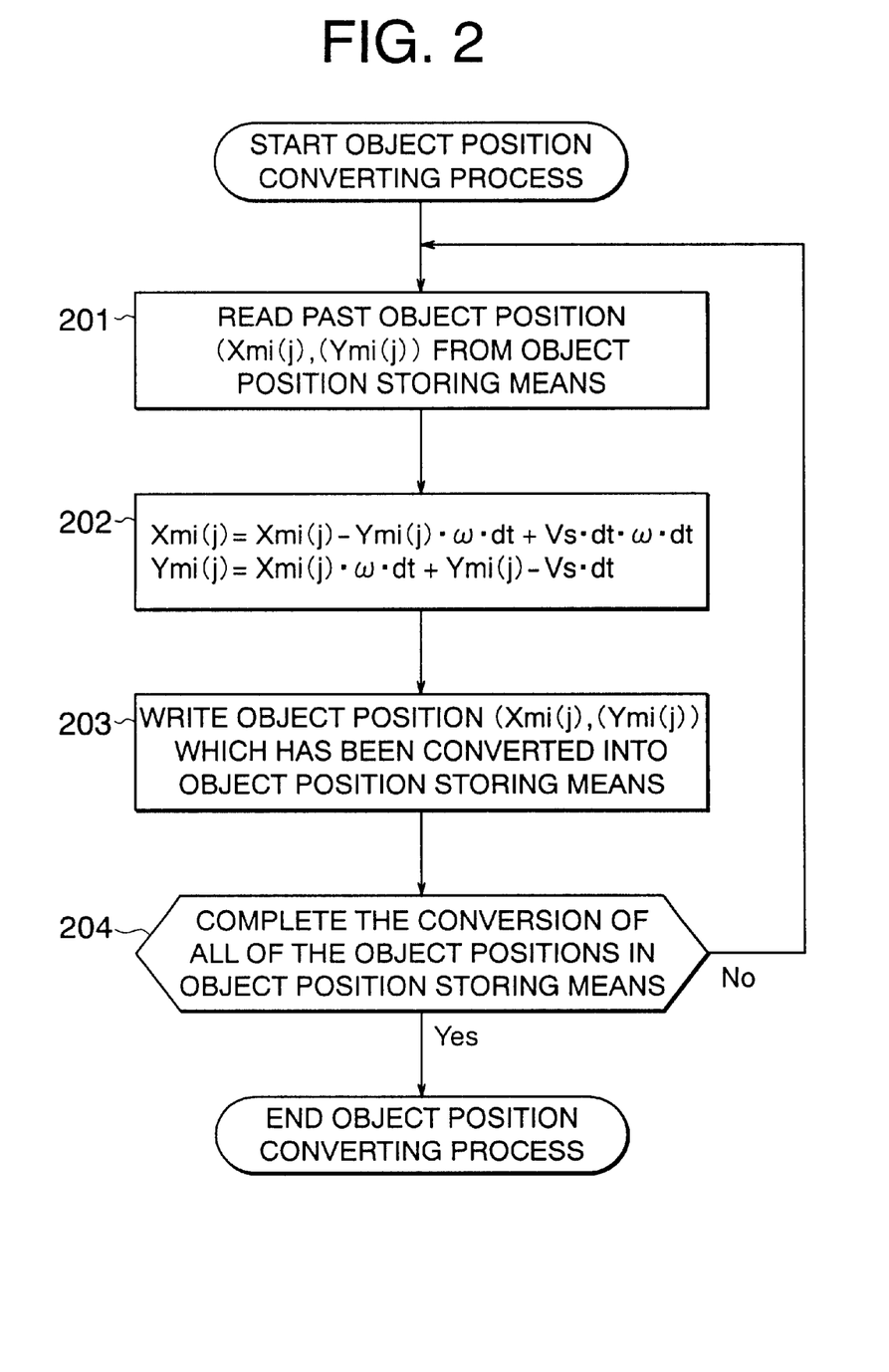
FIG. 2 is a flowchart showing a flow of an object position converting process of the vehicle surrounding monitoring apparatus in accordance with the first and second embodiments of the present invention.
Figure 3:
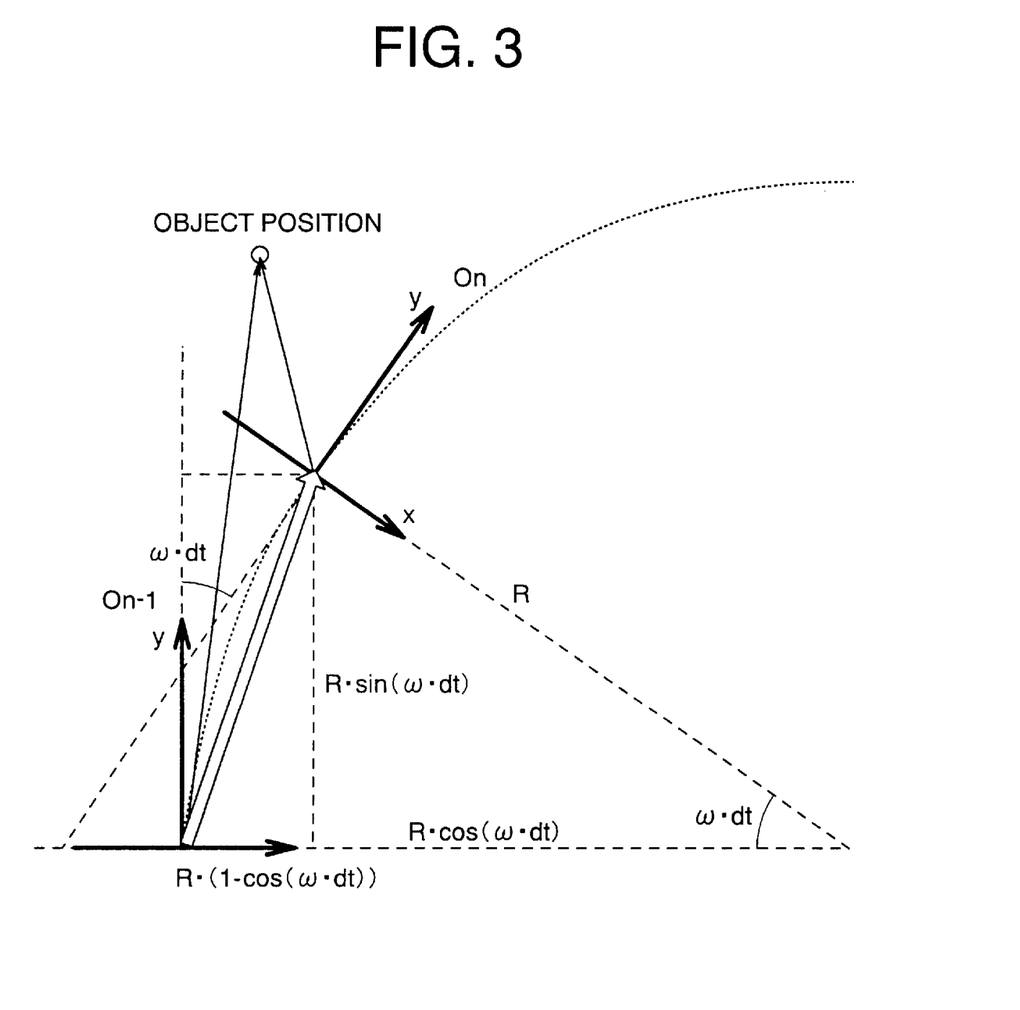
FIG. 3 is an explanatory diagram for explanation of the object position converting process.

Subsequently, the object position converting means 6 will be described. The object position converting means 6 is so designed as to convert past object position data stored in the object position storing means 5 into a position viewed from the coordinate system of the present self-vehicle that moved from the previous position, and its processing flow is shown in FIG. 2. Also, object position data (Xmi(j),Ymi(j)) detected in the past which is stored in the object position storing means 5 is read in a step 201, and the object position data is then converted as represented in an expression (9) in a step 202 (refer to FIG. 3).

$$\begin{pmatrix} Xmi(j) \\ Ymi(j) \end{pmatrix} = \begin{pmatrix} \cos\theta & -\sin\theta \\ \sin\theta & \cos\theta \end{pmatrix} \times \begin{pmatrix} Xmi(j) - R \times (1 - \cos\theta) \\ Ymi(j) - R \times \sin\theta \end{pmatrix} \approx \qquad (9)$$

$$\begin{pmatrix} Xmi(j) - Ymi(j) \times \omega \times dt + (Vs \times dt) \times (\omega \times dt) \\ Xmi(j) \times \omega \times dt + Ymi(j) - Vs \times dt \end{pmatrix}$$

Then, the converted position is written in the object position storing means 5 in a step 203, and it is judged in a step 204 whether the conversion of all the object position data stored in the object position storing means 5 is completed, or not, and if the conversion is completed, the object position converting process is completed.

In the stop object judging means 7, when the object position data detected in the past is converted into the position viewed from the coordinate system of the present self vehicle, it is judged whether the object to be detected is a stop object, or not, by using a principle that the object position detected at the present time is superimposed on the object position detected in the past at the same position in case of the stop object, and the object position detected at the present time is along the locus of the object in case of the moving object. That is, if a large amount of past object positions that have been converted exist in the vicinity of the object position detected at this time, it is judged that the object is the stop object.

Figure 4:
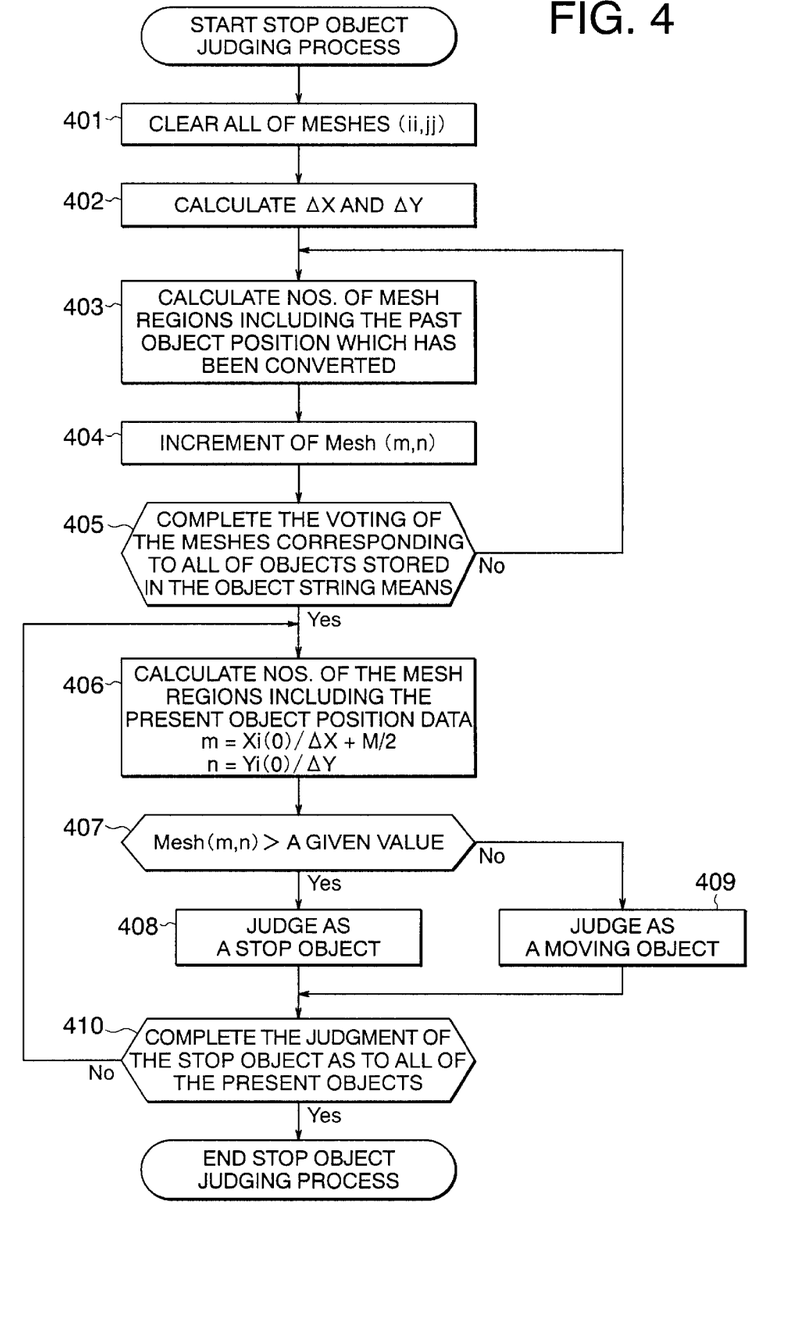
FIG. 4 is a flowchart showing a flow of a stop object judging process of the vehicle surrounding monitoring apparatus in accordance with the first embodiment of the present invention.

A more specific process in the stop object judging means 7 will be described with reference to FIG. 4.

Figure 5:
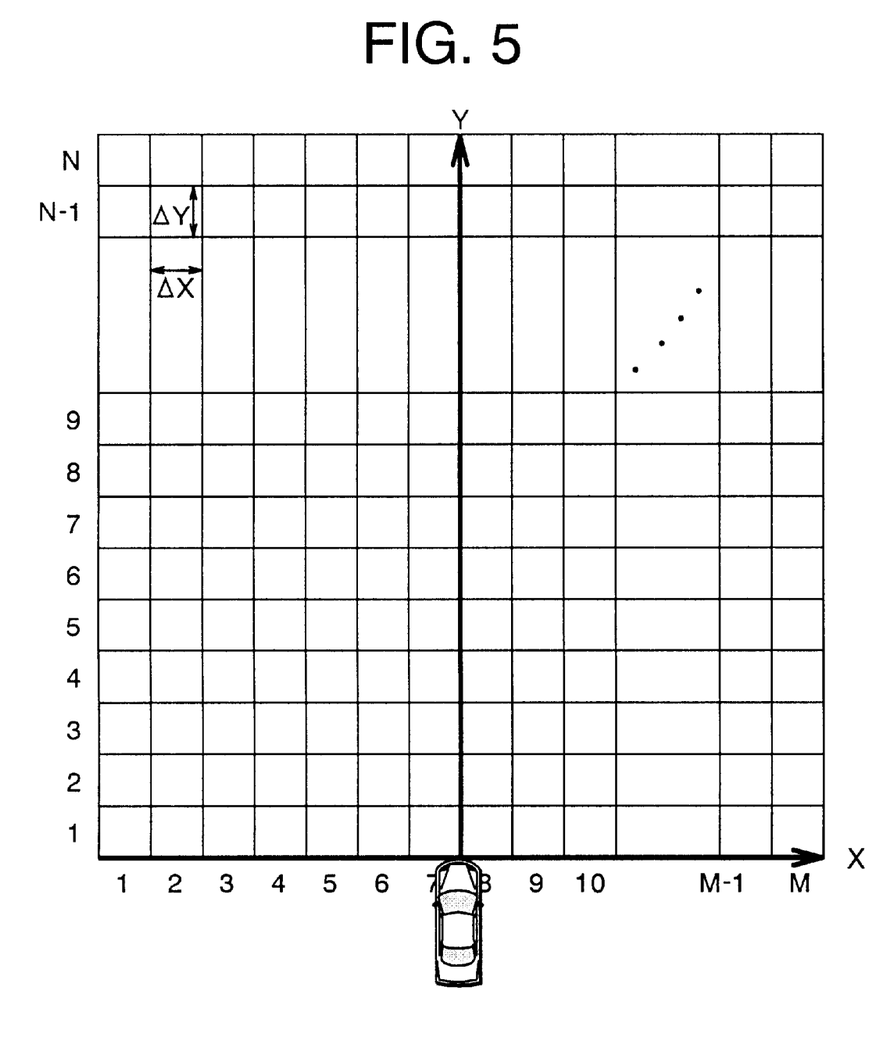
FIG. 5 is an explanatory diagram for explanation of the stop object judgment of the vehicle surrounding monitoring apparatus in accordance with the first embodiment of the present invention.

First, all of two-dimensional arrangement Mesh (m, n) (m=1 to M, n=1 to N) for storing the superimposing are zero-cleared in a step 401. The two-dimensional arrangement Mesh (m,n) is so designed as to divide the coordinate system of the self vehicle into a mesh-like region having a size of (ΔX, ΔY), and store the number of data of the object position contained in the respective mesh regions as shown in FIG. 5.

Then, in a step 402, the size (ΔX, ΔY) is set in accordance with the self vehicle speed by the following expressions (10) and (11) in a step 402.

$$X = \Delta X0 \qquad (10)$$

$$Y = (Vs \times T0)/N \qquad (11)$$

If the calculated ΔY is smaller than ΔY0, ΔY=ΔY0.

In this example, Vs is a self vehicle speed (m/s), and ΔX0, ΔY0 and T0 are predetermined values. As those appropriate values, ΔX0=0.25 (m), ΔY0 =0.5 (m), and T0=4.5 (s). If the size of the mesh is thus changed, the vehicle speed on the basis of which the stop object is judged can be set in accordance with the self vehicle speed. For example, in the case where the self vehicle speed is 100 (km/h), N=50 and the processing period is 200 (ms), ΔY becomes 2.5 (m), and an object whose moving distance is 2.5 (m) or less during 200 (ms), that is, an object whose moving distance is 45 (km/h) or less is judged as the stop object. Also, in the case where the self vehicle speed is 50 (km/h), N=50 and the processing period is 200 (ms), ΔY becomes 1.25 (m), and an object whose speed is 22.5 (km/h) or less is judged as the stop object.

Then, the number (m,n) of the mesh region including the past object position data (Xmi(j),Ymi(j)) is calculated by the following expressions (12) and (13), and Mesh (m,n) is made increment in steps 403 and 404.

$$m = Xmi(j)/\Delta X + N/2 \qquad (12)$$

$$n = Ymi(j)/\Delta Y \qquad (13)$$

Then, the number (m,n) of the mesh region including the object position data detected at this time is obtained by the expressions (12) and (13) in steps 406 to 410, and in the case where a value of Mesh (m,n) represented by (m,n) is a given value or more, the object is judged as the stop object.

In the relative speed calculating means 8, as shown in FIG. 1, a window having a given size is provided in accordance with the object position and the relative speed at the previous time by using the expressions (1) to (8), and the present object contained within the window is made to correspond to the previous object as in the conventional method. However, in the case where the previous object is judged as the stop object by the above-described stop object judging means 7, the previous object is made to correspond to the present object which is judged as the stop object likewise, and in the case where the previous object is judged as the moving object, the previous object is made to correspond to the present object which is judged as the moving object. Then, the relative speed at this time is calculated from a difference value between the previous object position and the present object position which are made to correspond to each other.

The output means 9 outputs a pair of the object position detected by the laser radar 1 and the relative speed calculated by the relative speed calculating means 8, to the inter-vehicle distance alarm controller 10 as the detected object information.

As described above, according to the first embodiment, since it is judged whether the detected object is the stop object or the moving object by a simple method using the self-vehicle speed and the yaw rate in advance, and the detected objects are separated into the stop object and the moving object to conduct the time-serial correspondence on the basis of the judging result, there is no case in which the stop object is made to correspond to the moving object in error, to thereby improve the accuracy in the relative speed. Also, since there is provided the simple method in which the coordinate space is divided into a mesh, and the object position data within the mesh is counted to judge the stop object, the method can be realized by a microcomputer mounted on the vehicle. In addition, since the size of the mesh is set in accordance with the self-vehicle speed, the speed of the object which is judged as the stop object can be set in accordance with the self-vehicle speed.

In the above description, the past object position data detected by the scanning laser radar 1 is stored in the object position storing means 5, and the object position data into which the past object position data has been converted by the object position converting means 6 is stored again in the object position storing means 5. However, the same effect is obtained even in the case where only the object position data detected by the scanning laser radar 1 which is not yet converted by the object position converting means 6 is stored in the object position detecting result storing means 5.

(Second Embodiment)

In a second embodiment, only the stop object judging means 7 in the above first embodiment is changed for the purpose of improving the accuracy in the stop object judgment taking into consideration the deterioration of the position accuracy of the laser radar at a long distance. Therefore, a stop object judging means 7 different from that in the first embodiment will be described below.

Figure 6:
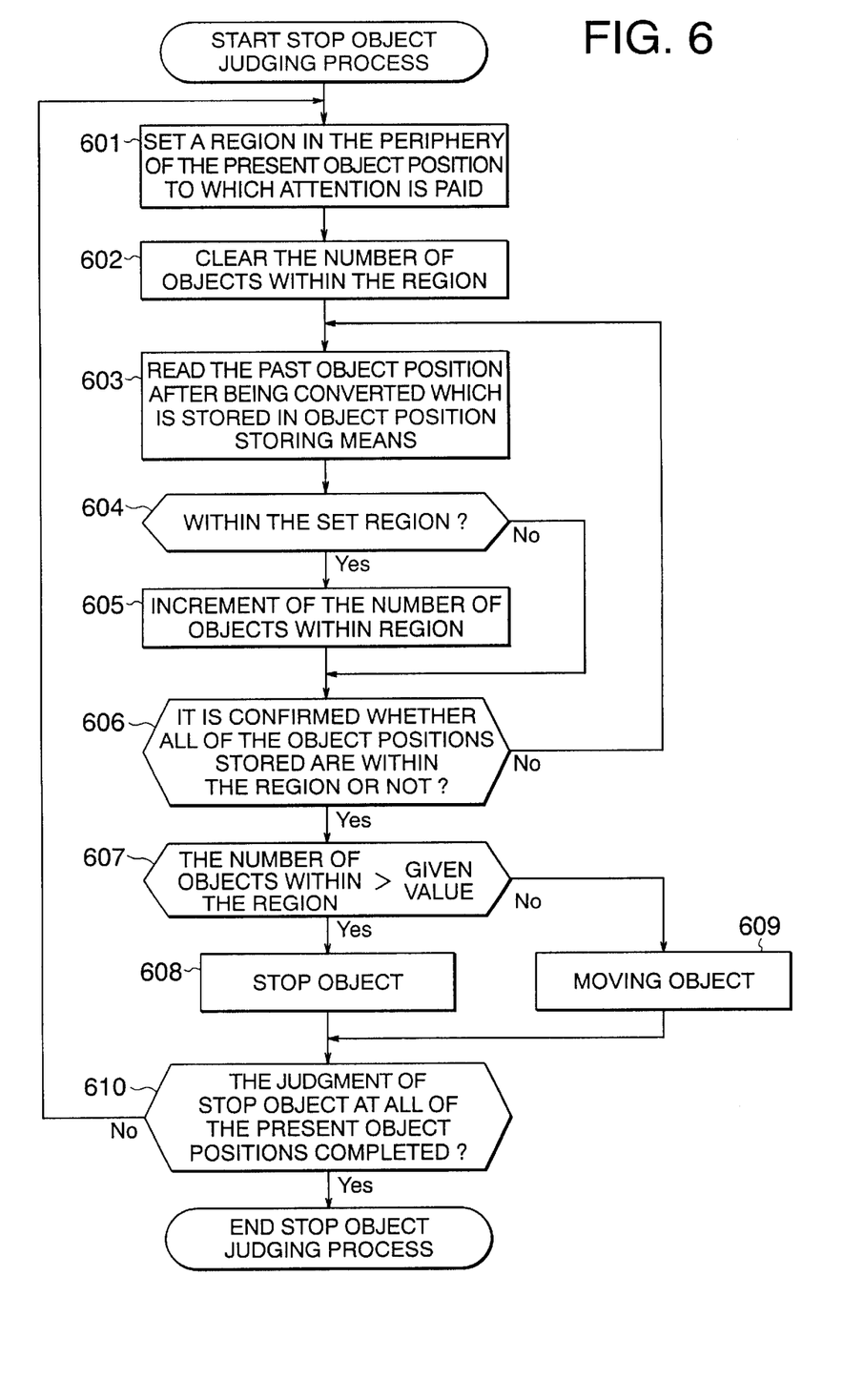
FIG. 6 is a flowchart showing a flow of a stop object judging process of the vehicle surrounding monitoring apparatus in accordance with the embodiment of the present invention.

FIG. 6 shows a flowchart of a process of the stop object judging means 7 in accordance with the second embodiment. First, in a step 601, a region having a given size (dXm,dYm) is set in the periphery of the object position detected at the present time. The size (dXm,dYm) is set in accordance with the position Yi(0) of the detected object to which attention is paid in the Y-direction by the following expressions (14) and (15).

$$dXm = K1 \times Yi(0) + dXm0 \quad (14)$$

$$dYm = K2 \times Yi(0) + dYm0 \quad (15)$$

where K1, K2, dXm0 and dYm0 are predetermined values.

Then in steps 602 to 606, it is judged whether each of the object positions stored in the object position storing means 5 is contained in the set region, or not, and if the object position is contained in the set region, the number of objects within the region with respect to the objects to which attention is paid is subjected to increment. Then, finally in steps 607 to 609, if the number of stop points is a given value or more, the object to which attention is paid is judged as the stop object.

As described above, according to the second embodiment, since the region for judging the stop object is changed in accordance with a distance, the stop object can be correctly judged to improve the precision in the relative speed calculation even in the laser radar where the position precision is deteriorated at a long distance (in the scanning radar, because the position information of the reflected object is detected in polar coordinates (r, θ) centering the laser radar in the scanning laser radar, the relative distance per a unit θ is increased at a long distance where r is large, to thereby deteriorate the position detection precision). However, since the stop object is judged in accordance with a distance, the precision in the relative speed calculation can be improved.

As was described above, according to the present invention, it is judged whether the previous object and the present object which are detected by the object position detecting means are identical with each other, or not, on the basis of the previous detected value and the present detected value of the object position data by the object position detecting means and the judgment result of the stop object judging means, and there is provided the relative speed calculating means that calculates the relative speed on the basis of the relative position of the same object, thereby being capable of judging whether the detected object is the stop object, or not, through the simple method using the self-vehicle speed and the yaw rate in advance.

Also, because the coordinate space defined by the self-vehicle coordinate system having the widthwise direction of the vehicle as an x-direction and the forwarding direction as a y-direction is divided into mesh-like regions each having a given size, and the object position data within the mesh is counted to judge the stop object, it can be judged whether the detected object is the stop object or not by a simple method.

Also, since the size of the mesh is set in accordance with the self-vehicle speed, the speed of the object which is judged as the stop object can be set in accordance with the self-vehicle speed.

Further, since the region for judging the stop object is changed in accordance with a distance, the stop object can be correctly judged, thereby being capable of improving the precision in the relative speed calculation.

In addition, since in the relative speed calculating means, the objects that are judged as the stop objects and the objects that are judged as the moving objects are made to correspond to each other as the same object in the time series by using the judging result of the stop object judging means, the relative speed is calculated and the objects are separated into the stop objects and the moving objects to conduct the correspondence in the time series, there is no case in which the stop object and the moving object are made to correspond to each other in error, thereby being capable of improving the precision in the relative speed.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A vehicle surrounding monitoring apparatus for detecting an object which exists in the periphery of a self vehicle and for detecting a relative speed calculated on the basis of a relative position with respect to the self vehicle and said relative position, said apparatus comprising:

an object position detecting means for periodically detecting object position data including a distance of from the self vehicle to the object that exists in the periphery of the self vehicle and an orientation directed from the self vehicle toward the object;

a self-vehicle speed detecting means for periodically detecting the speed of the self vehicle;

a yaw rate detecting means for periodically detecting a yaw rate which is the rotation rate of the self vehicle in a yaw direction;

an object position converting means for converting a previous object position data detected by said object position detecting means into eliminated object position data on the basis of (1) the previous object position that is detected at the present self-vehicle position, (2) of the self-vehicle speed information detected by said self-vehicle speed detecting means and (3) the yaw rate information detected by said object position detecting means;

an object position storing means for storing the object position data converted by said object position converting means;

a stop object judging means for judging whether said object is a stop object, or not, on the basis of the object position data stored in said object position storing means and the object position data detected at the present time by said object position detecting means; and a relative speed calculating means for judging whether the previous object and the present object which are detected by said object position detecting means are identical with each other, or not, on the basis of the object position data detected at the previous time by said object position detecting means, the object position data detected at the present time by said object position detecting means, and the judging result by said stop object judging means to calculate the relative speed.

2. The vehicle surrounding monitoring apparatus as claimed in claim 1, wherein said stop object judging means detects the region having the object position data detected at the present time by said object position detecting means in the case where the coordinate space regulated by the self-vehicle coordinate system having the widthwise direction of the vehicle as the x-direction and the forwarding direction as the y-direction is divided into the mesh-like regions each having the given size, and said stop object judging means counts the number of object position data within the region detected at the present time and judges whether the detected object is an stop object, or not in accordance with whether the count value of said object position data is a given value, or not.

3. The vehicle surrounding monitoring apparatus as claimed in claim 2, wherein said stop object judging means divides the coordinate space regulated by the self-vehicle coordinate system into the mesh-like regions each having a size set in accordance with the self-vehicle speed.

4. The vehicle surrounding monitoring apparatus as claimed in claim 1, wherein said stop object judging means provides a region having a given size set in accordance with each of the object positions in the periphery of each of the object positions detected at the present time by said object position detecting means, and judges that the detected object is a stop object in the case where the count value of the object position data that exists within the region having the given size set in accordance with each of the object positions among the objects stored in said object position storing means is equal to or more than a given value.

5. The vehicle surrounding monitoring apparatus as claimed in claim 1, wherein said relative speed calculating means makes the objects that are judged as the stop objects and the objects that are judged as the moving objects to correspond to each other as the same object in the time series by using the judging result of said stop object judging means, and calculates the relative speed.

* * * * *